Nov. 20, 1928.

J. SCHLAGENHAUF 1,692,141

AUTOMATIC BRAKE FOR TRAILERS

Filed Oct. 19, 1926    2 Sheets-Sheet 1

Inventor:

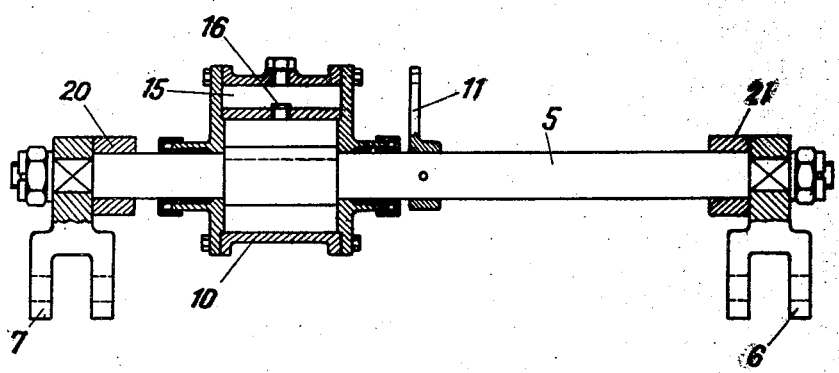
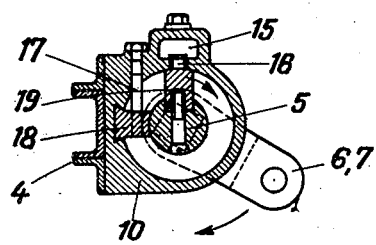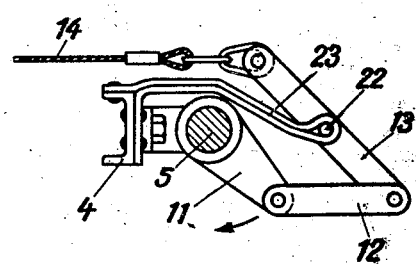

Patented Nov. 20, 1928.

1,692,141

UNITED STATES PATENT OFFICE.

JOHANN SCHLAGENHAUF, OF OERLIKON, SWITZERLAND.

AUTOMATIC BRAKE FOR TRAILERS.

Application filed October 19, 1926, Serial No. 142,633, and in Germany January 8, 1926.

In automatic brakes for the trailers of motor lorries, in which a piston rod guided in the radius bar is shifted in its longitudinal direction by the pressure exerted by the two cars the one onto the other and pulls the brake by this movement, results the inconvenience that these piston rods may be bent during service, this occurring for instance if the radius bar is dropped or if on a bad road the front wheels of the trailer sink into the road. When the piston rod has been bent the brake mechanism fails as the piston rod is no longer shiftable in longitudinal direction.

These inconveniences are avoided by the invention which will be hereinafter described.

An embodiment of the invention is shown, by way of example, in the accompanying drawing, in which Fig. 1 shows the arrangement in plan view, the car body being removed.

Fig. 3 is a section on line III—III of Fig. 1.

Fig. 4 is a section on line IV—IV of Fig. 1.

Fig. 5 illustrates the connection of the brake rope with shaft 5 viewed from the direction IV—IV.

Figure 2:
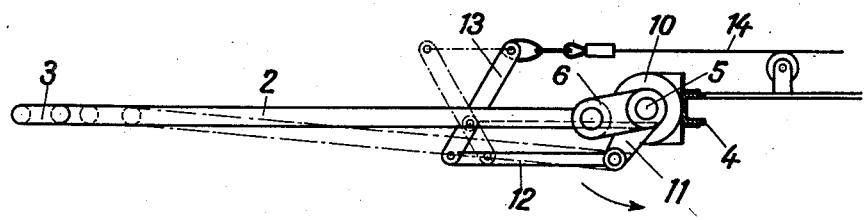
Fig. 2 is a side elevation of Fig. 1.
Figure 1:
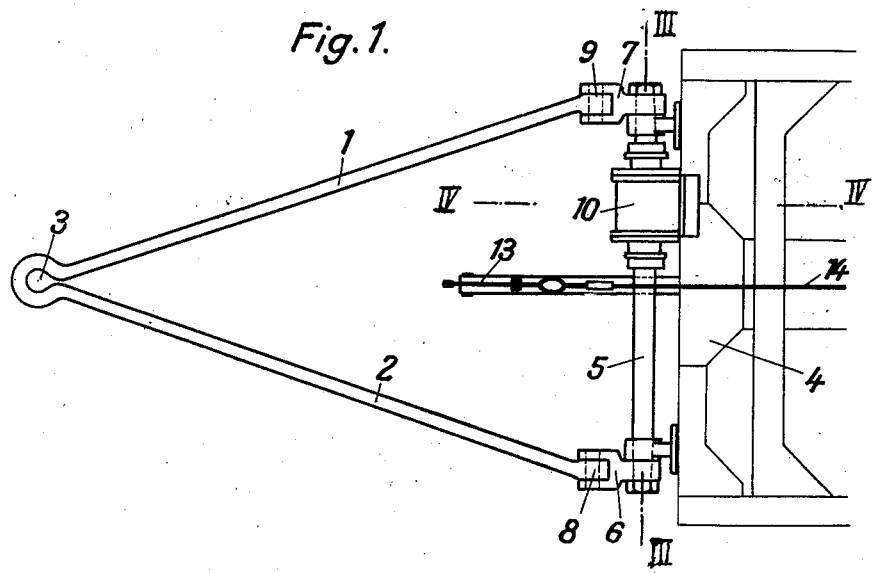

The improvement consists in that on the bogie 4 of the car a shaft 5 is mounted on which the forks 6 and 7 are keyed. To these forks 6 and 7 the ends 8 and 9 of the radius bars 1, 2 are hingedly connected. On the shaft 5 a dashpot 10 is further arranged which may consist, for instance of an hydraulic brake.

The brake 10 consists for instance of an oil vessel 15, a stationary flap 18 and a movable flap 19 fixed on shaft 5. In the hydraulic brake 10 a check valve 16 is arranged. Owing to this check valve the spare oil from chamber 15 can flow, according to requirement, into the chamber proper of the hydraulic brake but not flow back into the chamber 15. For the operation of the brake it is advantageous if the space in the hydraulic brake is permanently filled completely with oil, this being ensured by the valve 16 and the reservoir chamber 15. A screw 17 serves to regulate the hydraulic brake, i. e. if in the cold season the oil in the brake becomes viscous the free cross section of the passage can be enlarged by adjusting the screw accordingly.

If the eye 3 is hooked over the coupling hook of the tractor and if the trailer closes up on the tractor the shaft 5 is rotated in the direction of the arrow in Fig. 2 (position of the elements shown in dash and dot lines) and it pulls the brake lever system 11, 12, 13, 14 through the intermediary of the brake 10.

The lever 11 is mounted on the shaft 5. The two-armed lever 13 is hinged to lever 11 by means of a connecting rod 12. The lever 13 is pivotably mounted by a pin 22 in a holder 23 which is fixed to car 4. If lever 11 is moved in the direction of the arrow the rope 14 is pulled and the car is braked.

This influence upon the brake system remains effective if the radius bars 1 and 2 are bent.

I claim:—

A brake acting when the trailer is closing up on the tractor, comprising in combination with the radius bar and with the bogie, of the trailer a shaft rotatably mounted on said bogie two lever arms hingedly connecting the ends of said radius bar to said shaft, a dashpot on said shaft, and a brake lever system connected to and operated from said dashpot.

In testimony whereof I affix my signature.

JOHANN SCHLAGENHAUF.